(12) United States Patent
Hussain et al.

(10) Patent No.: US 6,901,500 B1
(45) Date of Patent: May 31, 2005

(54) METHOD AND APPARATUS FOR PREFETCHING INFORMATION AND STORING THE INFORMATION IN A STREAM BUFFER

(75) Inventors: Zahid S. Hussain, San Jose, CA (US); Tim J. Millet, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 714 days.

(21) Appl. No.: 09/627,471

(22) Filed: Jul. 28, 2000

(Under 37 CFR 1.47)

(51) Int. Cl.[7] ............................................. G06F 13/16
(52) U.S. Cl. ..................... 711/213; 711/122; 710/53; 710/52; 712/237
(58) Field of Search ...................... 710/52, 53; 711/3, 711/109, 122, 132, 169, 140, 213; 721/237, 239

(56) References Cited

U.S. PATENT DOCUMENTS 5,261,066 A * 11/1993 Jouppi et al. ............... 711/122
5,664,147 A * 9/1997 Mayfield ..................... 711/137
5,761,706 A * 6/1998 Kessler et al. .............. 711/118
6,085,291 A * 7/2000 Hicks et al. ................. 711/137

FOREIGN PATENT DOCUMENTS

| EP | 449540 A2 | * 10/1991 |
| JP | 09265432 A | * 10/1997 |
| JP | 09319657 A | * 12/1997 |

* cited by examiner

Primary Examiner—B. James Peikari
(74) Attorney, Agent, or Firm—Baker Botts L.L.P.

(57) ABSTRACT

A system for prefetching information from a computer storage includes a central processing unit operable to transmit to a transfer bus a memory transfer request containing a desired memory address. The system also includes a system controller operable to receive the memory transfer request from the transfer bus and to retrieve a prefetch block of data from the computer storage in response to determining that a stream buffer local to the system controller does not contain a copy of data stored at the desired memory address. The system controller is further operable to retrieve the data from the stream buffer and communicate the data to the central processing unit in response to determining that the stream buffer contains a copy of the data stored at the desired memory address.

24 Claims, 4 Drawing Sheets

US 6,901,500 B1

METHOD AND APPARATUS FOR PREFETCHING INFORMATION AND STORING THE INFORMATION IN A STREAM BUFFER

TECHNICAL FIELD OF THE INVENTION

This invention relates generally to computer systems and, more particularly, to a system and method for prefetching information from a computer storage.

BACKGROUND OF THE INVENTION

Many computer processors now include cache systems physically integrated into the processors. When data from a memory is requested, the processor first checks the cache to determine if the data is already stored in the cache. When the data is not in the cache, resulting in a "cache miss," the processor typically accesses a central memory, retrieves the desired data, and stores that data in the cache for future use. Retrieving information from the central memory generally requires accessing a transfer bus linking the processor to other system components. Therefore, it typically takes longer to retrieve data from the memory than from the cache, and this increase in time results in a higher latency for the processor. Higher latencies mean lower performance rates for the processor since the processor is waiting to receive the data from the memory, rather than performing other functions.

One approach to reducing latency is to prefetch a block of data from the memory and store it in a cache residing in the central processing unit. When a processor prefetches data, the processor not only retrieves the requested data from the memory, but also data that has not yet been requested but which might be requested in the future. All of the retrieved data is then stored in the cache residing in the central processing unit. If and when the processor actually requests the additional data that was prefetched from the memory, the processor retrieves the data from the cache rather than from the memory.

Several problems exist with current cache systems. One problem is that caches physically located on the processor chip are typically very shallow due to the demand for chip space by other physical features of the processor. The small size means that only a limited amount of data can be stored in the cache. The small size of the on-chip cache often leads to the use of intelligence, which is used to control the behavior of the cache and to maximize the cache's performance. For example, the intelligence may determine the data that is most likely to be requested in the future and prefetch that data accordingly. However, the intelligence also adds complexity and expense to the design of the processor.

Another disadvantage of locating the cache in the central processing unit is the added traffic created on the central processing unit transfer bus. In order to prefetch multiple pieces of data from the memory, the processor makes multiple memory transfer requests to retrieve the desired data. The processor is unable to carry out other instructions while the processor is issuing the memory transfer requests. The memory transfer requests take time and further reduce the performance of the processor. Furthermore, these multiple transfer requests put a heavy load on the transfer bus.

SUMMARY OF THE INVENTION

The present invention recognizes a need for an improved method and system for prefetching information from a computer storage, and the present invention provides a method and system for prefetching information that reduces or eliminates many shortcomings of prior systems and methods.

In accordance with one aspect of the present invention, a system for prefetching information from a computer storage comprises a central processing unit operable to transmit to a transfer bus a memory transfer request containing a desired memory address. The system also comprises a system controller operable to receive the memory transfer request from the transfer bus and to retrieve a prefetch block of data from the computer storage in response to determining that a stream buffer local to the system controller does not contain a copy of data stored at the desired memory address. The system controller further operable to retrieve the data from the stream buffer and communicate the data to the central processing unit in response to determining that the stream buffer contains a copy of the data stored at the desired memory address.

Technical advantages of the present invention include the ability to use a larger and simpler stream buffer located outside of the processor. In one embodiment of the invention, the stream buffer may be located on the system controller. Because there is less demand for the physical area of the system controller than the physical area of the processor, the stream buffer located on the system controller can be much larger. In another embodiment, the stream buffer resides outside the system controller and the central processing unit but is accessible to the system controller. This also allows the stream buffer to be much larger than if it was physically located on the processor.

The increased size of the stream buffer reduces the need to implement intelligence associated with the stream buffer. The use of a larger stream buffer means that more data can be stored in the stream buffer, decreasing the need to more accurately predict what data might be requested in the future. The reduction or elimination of intelligence reduces the complexity and the expense of the computer system.

Further, by locating the stream buffer outside of the processor, the system controller may prefetch data from the memory without interfering with the operation of the processor or placing an excessive load on the transfer bus. The system controller may retrieve multiple pieces of data while the processor is performing other operations, thereby increasing the performance of the processor.

In addition, the stream buffer may be configured as a read-only memory from the perspective of the processor. The processor may read data from the stream buffer but need not write data to the stream buffer. As a result, the processor does not need to update information in the stream buffer when the processor writes data to the memory. Since in this embodiment the processor need not issue instructions to update the stream buffer, the performance of the processor is increased.

Other technical advantages are readily apparent to one of skill in the art from the attached figures, description and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
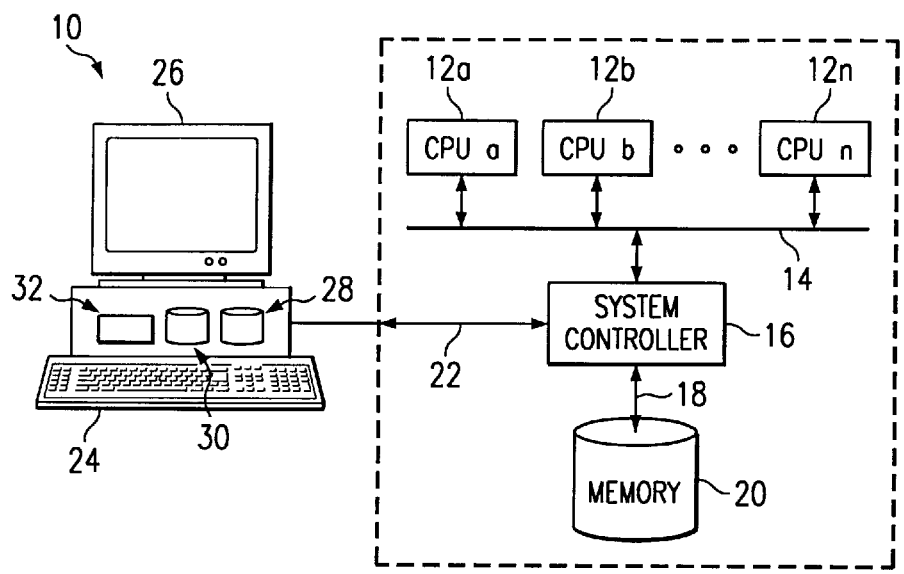
FIG. 1 is a block diagram illustrating an exemplary computer system constructed in accordance with the teachings of the present invention.

FIG. 1 is a block diagram of an exemplary computer system 10. Computer system 10 includes one or more processors 12a–12n having a system clock or other suitable timing device or software, a system controller 16, an input device 24, an output device 26, a random access memory (RAM) 28, a read-only memory (ROM) 30, and a CD-ROM, a hard drive, or other magnetic or optical storage media 32 or other appropriate volatile or nonvolatile storage and retrieval devices.

Input device 24 may comprise, for example, a keyboard, a mouse, a graphics tablet, a touch screen, a pressure-sensitive pad, a joystick, a light pen, a microphone, or other suitable input device. Output device 26 may comprise, for example, a video display, a printer, a disk drive, a plotter, a speaker, or other suitable output device.

Items within the dashed lines in FIG. 1 represent exemplary functional operation and data organization of the associated components of computer system 10. For example, each computer system 10 includes or otherwise has access to a memory 20. Memory 20 may comprise any of a variety of data structures, arrangements or compilations operable to store and facilitate retrieval of various information stored at computer system 10. Although memory 20 is depicted as residing within computer system 10, all or any portion of memory 20 could alternatively reside at another location accessible to computer system 10.

System controller 16 is a device that, among other functions, allows processors 12a–12n to access, store, and/or retrieve data from a computer storage. Throughout this document, the term "computer storage" refers to any storage medium comprising hardware, software, firmware, or any combination thereof that facilitates storage and retrieval of information. The computer storage may, for example, comprise memory 20. System controller 16 may also facilitate communication between, for example, processors 12a–12n and input device 24 and/or output device 26. System controller 16 is coupled to processors 12a–12n over a transfer bus 14 and to memory 20 over a memory bus 18. System controller 16 is coupled to input device 24 and output device 26 through an input/output bus 22. Transfer bus 14, memory bus 18, and input/output bus 22 may comprise any hardware, software, or combination thereof operable to facilitate information transfer between processors 12a–12n, system controller 16, memory 20, and other system components such as input device 24 and output device 26. Transfer bus 14 may comprise a pipelined transaction bus capable of transferring memory requests from multiple processors 12a–12n to system controller 16 and transferring multiple pieces of data from system controller 16 to processors 12a–12n. In this document, the terms "couple", "coupled", and "coupling" refer to any direct or indirect connection between two elements within computer system 10, whether or not the two elements are in physical contact with one another.

System controller 16 is operable to receive data and instructions from processors 12a–12n and transmit data and instructions to memory 20. System controller 16 may also receive data from memory 20 and transmit the data to processors 12a–12n.

In one aspect of operation, processors 12a–12n transmit memory transfer requests over transfer bus 14 to system controller 16. The memory transfer requests may comprise, for example, read operations or write operations. A read memory transfer request may contain a desired memory address in memory 20 where requested data is stored. A write memory transfer request may contain data to be written to memory 20 and a desired memory address in memory 20 where the data is to be written.

After receiving a memory transfer request, system controller 16 interprets the request and construct an appropriate memory instruction telling memory 20 to perform a read or write operation. System controller 16 then transmits the memory instruction to memory 20 over memory bus 18.

After receiving a write instruction from system controller 16, memory 20 stores the data transmitted in the instruction to the desired memory address. After receiving a read instruction from system controller 16, memory 20 transmits the data stored at the desired memory address to system controller 16 over memory bus 18, and system controller 16 transmits the data to processors 12a–12n over transfer bus 14.

A problem facing designers of computer system 10 is how to efficiently retrieve data from memory 20 without slowing the performance of processors 12a–12n. Other approaches that use a cache system residing in processors 12a–12n suffer from several shortcomings: the storage area in the cache is typically small, intelligence which is often used to assist the operation of the cache increases the complexity and cost of processors 12a–12n, and storing multiple pieces of data in the cache requires processors 12a–12n to issue multiple memory transfer requests across transfer bus 14. Various aspects of the present invention alleviate these problems. For example, retrieving and storing prefetched data in an area outside of processors 12a–12n eliminates the need for processors 12a–12n to issue multiple memory transfer requests to memory 20. This feature also eliminates the need to transmit multiple pieces of data back to processors 12a–12n for storage in a cache within processors 12a–12n. Exemplary elements within one embodiment of system controller 16 that facilitate these and other advantages are shown in greater detail in FIG. 2, which is now described.

Figure 2:
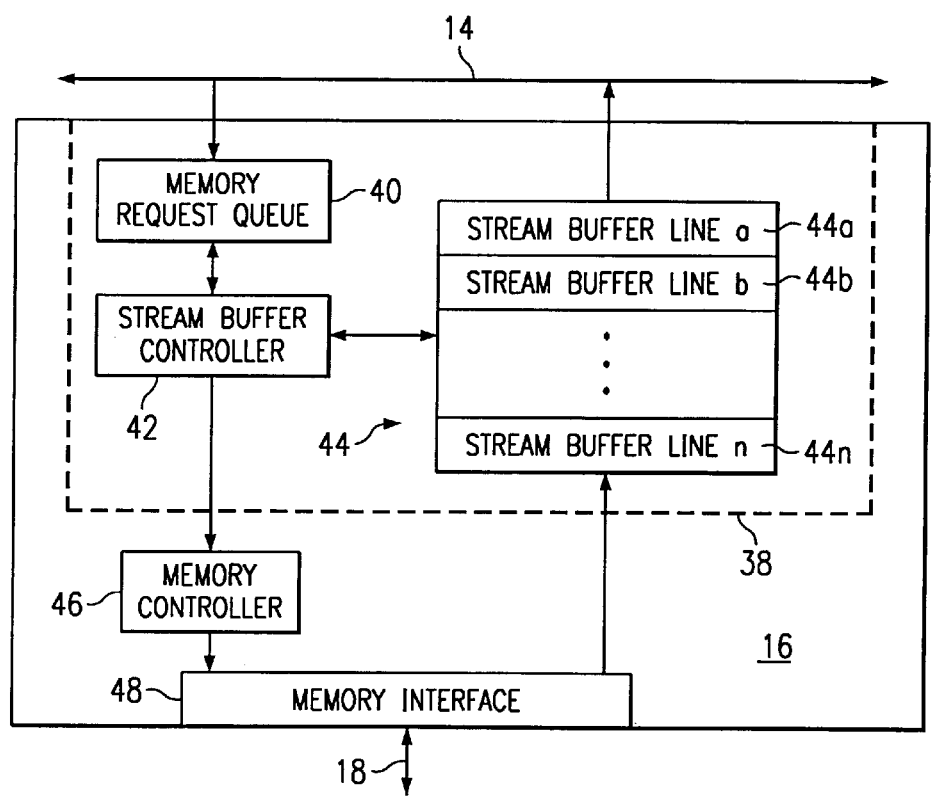
FIG. 2 is a block diagram illustrating an exemplary system controller constructed in accordance with the teachings of the present invention.

FIG. 2 is an exemplary block diagram of system controller 16 constructed in accordance with the teachings of the present invention. System controller 16 comprises a central processing unit control interface 38, a memory controller 46, and a memory interface 48. In the illustrated embodiment, central processing unit control interface 38 is an interface that controls the prefetching of data from memory 20. Memory controller 46 is a control device that oversees the transfer of data into and out of memory 20. Memory interface 48 is an interface allowing communication between system controller 16 and memory 20.

Central processing unit control interface 38 comprises a memory request queue 40, a stream buffer controller 42, and a stream buffer 44. Memory request queue 40 is operable to receive the memory transfer requests from processors 12a–12n over transfer bus 14 and allow processors 12a–12n to transmit multiple memory transfer requests to system controller 16. Memory request queue 40 stores the memory transfer requests and transmits each request to stream buffer controller 42. Memory request queue 40 may transmit the memory transfer requests in the order received or alternatively include a priority scheme where memory transfer requests are transmitted in order of increasing or decreasing priority. Memory request queue 40 may, for example, be implemented using a dynamic linked list, a set of dynamic linked lists, a table, or any other data structure, compilation, or device capable of receiving, storing, and/or retrieving multiple memory transfer requests.

In the illustrated embodiment, stream buffer 44 comprises a set of stream buffer lines 44a–44n. Each stream buffer line 44a–44n is operable to receive and store data retrieved from memory 20. Stream buffer 44 may be a storage medium comprising hardware, software, firmware, or any combination that facilitates storage and retrieval of information retrieved from memory 20. Stream buffer 44 may, for example, be a random access memory, an array, a linked list, a table, or any other data structure or device capable of receiving, storing, and/or retrieving data from memory 20.

Stream buffer controller 42 controls the operation of stream buffer 44. Stream buffer controller 42 is operable to receive a memory transfer request from memory request queue 40, determine if stream buffer 44 contains the data requested in the memory transfer request, and transmit the memory transfer request to memory controller 46 if needed.

Memory controller 46 receives memory transfer requests from stream buffer controller 42 and determines appropriate operations to facilitate the memory transfer requests. Memory controller 46 constructs memory instructions for memory 20 and transmits the instructions to memory interface 48, which transmits the instructions to memory 20 over memory bus 18. Memory interface 48 is also operable to receive data from memory 20 over memory bus 18 and to transmit that data to stream buffer 44.

In one aspect of operation, stream buffer controller 42 receives a memory transfer request and determines whether the memory transfer request comprises a read or write operation. When stream buffer controller 42 receives a write memory transfer request, stream buffer controller 42 determines the desired memory address contained in the memory transfer request. Stream buffer controller 42 determines whether data stored at the desired memory address in memory 20 is also stored in stream buffer 44. In one embodiment, stream buffer controller 42 invalidates any stream buffer line 44a–44n in stream buffer 44 containing data associated with the desired write address. By invalidating a stream buffer line 44a–44n in stream buffer 44 containing data associated with the desired write address, system controller 16 reduces latency by eliminating the need to update stream buffer 44. Processors 12a–12n need not issue an instruction to update stream buffer 44, which also reduces the latency of computer system 10. In another embodiment, stream buffer controller 42 determines the new data value being stored at the desired memory address in memory 20, and stream buffer controller 42 stores the new data value in stream buffer 44. In both embodiments, stream buffer controller 42 ensures that computer system 10 will not return stale data to processors 12a–12n. Ultimately, stream buffer controller 42 transmits the write memory transfer request to memory controller 46.

When stream buffer controller 42 receives a read memory transfer request, stream buffer controller 42 determines the memory address associated with the memory transfer request. Stream buffer controller 42 also determines whether data stored at the desired memory address in memory 20 is also stored in stream buffer 44. If stream buffer 44 contains the data requested by the memory transfer request, stream buffer controller 42 instructs stream buffer 44 to transmit the desired data to processors 12a–12n over transfer bus 14. This avoids latency that would otherwise accompany taking the time to send an instruction over memory bus 18 to retrieve the desired data from memory 20.

In cases where stream buffer 44 does not contain the data requested by the read memory transfer request, stream buffer controller 42 will retrieve from memory 20 a prefetch block of data including not only the desired data, but also data residing in memory addresses associated with the desired memory address. The entire prefetch block is then stored in stream buffer 44, and stream buffer 44 transmits the requested data to processors 12a–12n over transfer bus 14. Throughout this document, the terms "prefetch", "prefetched", and "prefetching" include retrieving data that is not expressly requested by processors 12a–12n, but which may be requested in the future. A "prefetch block" of data comprises the data requested by processors 12a–12n and related data that has not yet been expressly requested.

An advantage of the present invention is the flexibility in the size of stream buffer 44. By locating stream buffer 44 outside of processors 12a–12n, stream buffer 44 may store more data than a typical on-chip cache. By increasing the size of stream buffer 44, system controller 16 may prefetch more blocks of data, increasing the performance of computer system 10. In addition, the larger size of stream buffer 44 decreases the need to use intelligence to control the behavior of system controller 16 and to maximize the performance of stream buffer 44. Of course, intelligence may be used with stream buffer 44, but the flexibility in size of stream buffer 44 offered by the present invention reduces the need for intelligence.

Although FIG. 2 shows stream buffer 44 as an integrated part of system controller 16, the present invention may be implemented with any stream buffer that is local to system controller 16. The term "local" as used in this document refers to any location within computer system 10 that is accessible by system controller 16 without using transfer bus 14.

Figure 3:
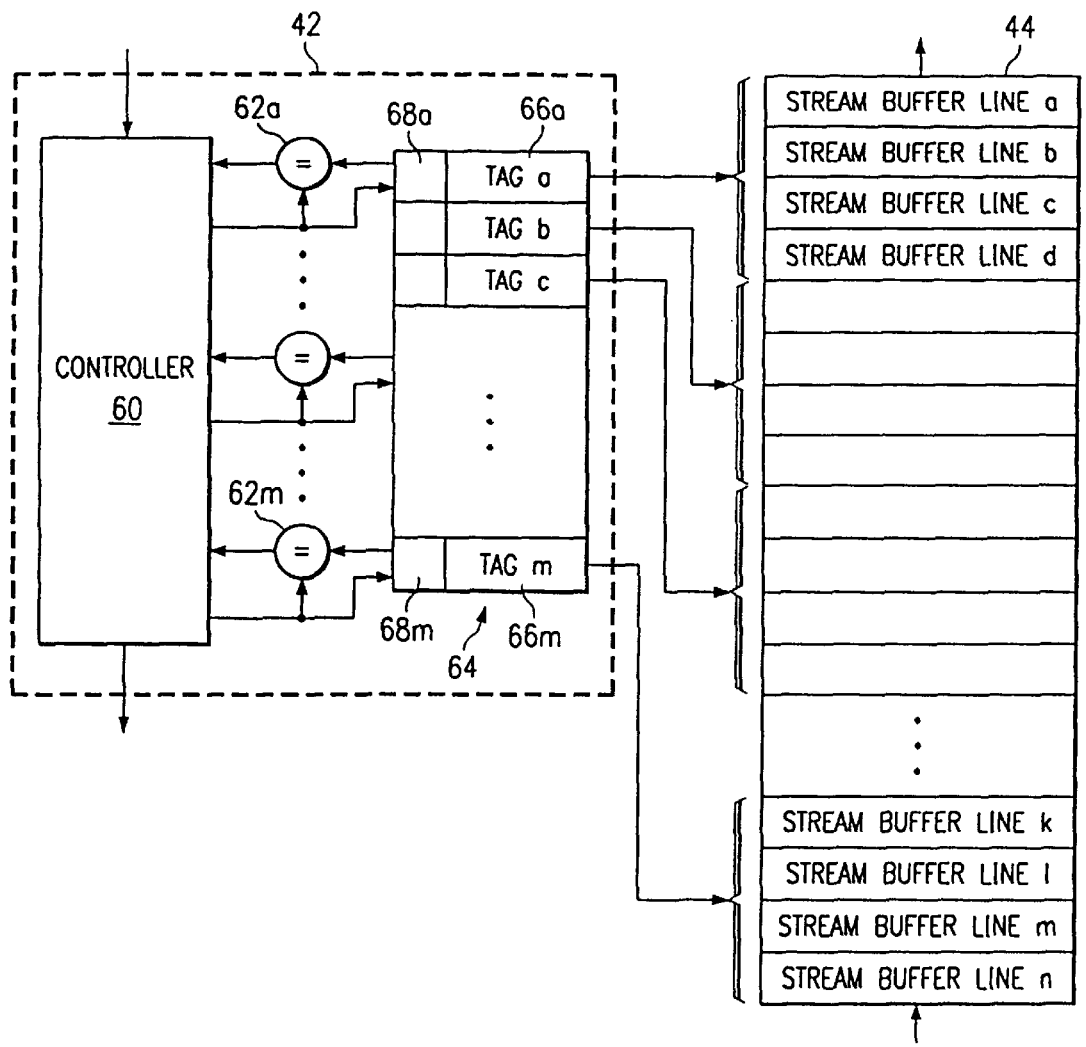
FIG. 3 is a block diagram illustrating an exemplary interaction between a stream buffer controller and a stream buffer.

FIG. 3 is a block diagram illustrating an exemplary interaction between stream buffer controller 42 and stream buffer 44. In the illustrated embodiment, stream buffer controller 42 comprises a controller 60, a plurality of comparators 62a–62m, and a tag table 64.

Controller 60 is operable to receive memory transfer requests from memory request queue 40 and transmit the requests to memory controller 46. Controller 60 is also operable to transmit data and instructions to tag table 64.

Tag table 64 contains information about the prefetch blocks of data stored in stream buffer lines 44a–44n. Throughout this document, the term "tag table" refers to any data structure, compilation, arrangement, or device capable of storing and facilitating retrieval of information about the prefetch blocks of data in stream buffer 44. In one embodiment, tag table 64 comprises of a plurality of tags 66a–66m and a corresponding set of validity markers 68a–68m.

In this embodiment, each tag 66 is associated with one or more stream buffer lines 44a–44n in stream buffer 44. In this embodiment, stream buffer lines 44a–44n comprise data retrieved from memory 20. Stream buffer lines 44a–44n may also comprise a memory address associated with that data in memory 20. Each tag 66 identifies one or more stream buffer lines 44a–44n currently storing data associated with those addresses. FIG. 3 shows each tag 66 identifying four stream buffer lines 44a–44n. However, each tag 66 could be configured to correspond to any number of stream buffer lines 44a–44n. In this example, tag 66a in tag table 64 identifies stream buffer lines 44a–44d; tag 66m in tag table 64 identifies stream buffer lines 44k–44n. In this embodiment, each tag 66 always identifies the same set of stream buffer lines 44a–44n in stream buffer 44.

Each validity marker 68 corresponds to one of the tags 66a–66m. Each validity marker 68 indicates whether the corresponding tag identifies valid data in stream buffer 44. When a set of stream buffer lines 44a–44n contains invalid data, the tag 66 identifying that set of stream buffer lines has a corresponding validity marker 68 set to "invalid." When a tag 66 identifies stream buffer lines 44a–44n currently holding valid data, the validity marker 68 for that tag is set to valid. Validity markers 68a–68m can be any data structure or device capable of indicating when tags 66a–66m identify valid data in stream buffer 44.

In a particular embodiment, validity markers 68a–68m may be used to invalidate stale, or potentially stale, data residing in stream buffer 44. For example, validity marker 68 may be set to "valid" when information retrieved from memory 20 is first written in stream buffer 44. That information could be invalidated upon receipt of a write memory transfer request directed toward a memory address in memory 20 containing information also stored in stream buffer 44. By invalidating information upon receiving a write memory transfer request associated with that information, computer system 10 avoids storing and retrieving stale information, while reducing latency by not writing the updated information to stream buffer 44.

Comparators 62a–62m couple controller 60 to tag table 64. As used in this document, the term "comparator" refers to any hardware, software, firmware, or combination thereof operable to compare data transmitted from controller 60 to data stored in tag table 64. In this embodiment, comparators 62a–62m receive at least the address portion of the memory transfer request from controller 60, and comparators 62a–62m compare the address with tags 66a–66m to determine whether stream buffer 44 contains the desired data. Comparators 62a–62m transmit the results of the comparison back to controller 60.

In one embodiment, controller 60 receives a memory transfer request from memory request queue 40 and determines the desired memory address contained in the memory transfer request. Controller 60 computes a tag for that desired memory address and transmits the computed tag to comparators 62a–62m. Comparators 62a–62m compare the computed tag transmitted by controller 60 to tags 66a–66m currently stored in tag table 64 and transmit the results back to controller 60. If controller 60 finds that the computed tag matches a tag 66 in tag table 64, controller 60 determines if the corresponding validity marker 68 for the matching tag in tag table 64 is valid. A "valid" validity marker 68 for the matching tag indicates that stream buffer 44 currently holds a valid copy of the data stored at the desired memory address in memory 20. Otherwise, there is no valid matching tag in tag table 64.

Controller 60 also determines whether the memory transfer request comprises a read or a write operation. When controller 60 receives a write operation and finds no matching tag in tag table 64, controller 60 transmits the write memory transfer request to memory controller 46. Since in that case stream buffer 44 does not contain a copy of the data stored at the desired memory address in memory 20, there is no danger that stream buffer 44 will contain an inconsistent data value for that address.

When controller 60 receives a write operation and finds a matching tag in tag table 64, controller 60 sets the corresponding validity marker 68 for the matching tag to invalid. Alternatively, controller 60 could instruct stream buffer 44 to update the data in stream buffer 44. Either way, controller 60 ensures that stream buffer 44 and memory 20 do not contain different data values for the same memory address. Controller 60 transmits the write memory transfer request to memory controller 46.

For read operations, if controller 60 locates a matching tag in tag table 64, the data requested in the memory transfer request is already stored in stream buffer 44. Controller 60 instructs stream buffer 44 to transmit the requested data to processors 12a–12n. No memory transfer requests are sent to memory controller 46.

When controller 60 receives a read operation and finds no matching tag in tag table 64, controller 60 retrieves a prefetch block of data from memory 20. Controller 60 transmits a read memory transfer request containing the desired memory address to memory controller 46. Controller 60 also transmits one or more additional read memory transfer requests containing memory addresses associated with the desired memory address. The additional memory transfer requests will prefetch data from memory 20. Together, these requests will retrieve the prefetch block of data from memory 20.

Controller 60 also locates a position within stream buffer 44 to store the prefetch block. If there is sufficient empty space in stream buffer 44, controller 60 may select that space to store the prefetch block. Otherwise, controller 60 selects an occupied tag 66 to replace. For example, controller 60 may locate an invalid tag 66 in tag table 64, or controller 60 may select a valid tag 66 that has been unused for the longest time. Controller 60 computes a tag that will be used to index the current prefetch block and stores the computed tag in tag table 64, replacing the old value for the selected tag 66. Controller 60 also sets the corresponding validity marker 68 for that tag to valid. In addition, controller 60 instructs stream buffer 44 to store the new prefetch block in those stream buffer lines 44a–44n associated with the newly determined tag 66 in tag table 64.

Figure 4:
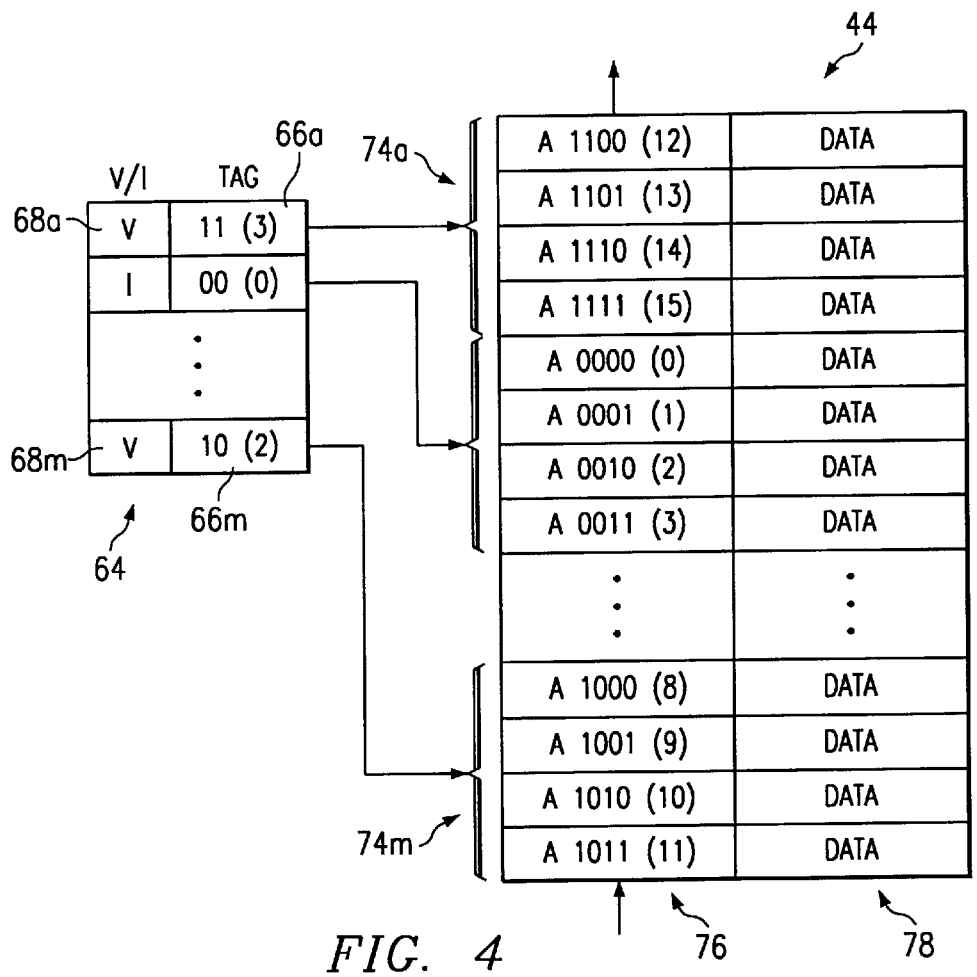
FIG. 4 is a block diagram illustrating an exemplary data storage arrangement within a stream buffer controller and a stream buffer.

Exemplary methods for computing the values of tags 66a–66m in tag table 64, for determining the number of stream buffer lines 44a–44n each tag 66 identifies, and for determining data to prefetch from memory 20 are illustrated in FIG. 4, which is now described.

FIG. 4 illustrates an exemplary data storage arrangement within stream buffer controller 42 and stream buffer 44. Tag table 64 contains several sample tags 66a–66m. Stream buffer 44 contains several sample data values and associated memory addresses stored in stream buffer lines 44a–44n.

Many methods exist for computing values for tags 66a–66m. One method involves controller 60 computing tags 66a–66m by truncating the least significant bits of the desired memory addresses contained in the memory transfer requests. In this document, the terms "truncate", "truncated", and "truncating" refer to any method of focusing on a subset of the bits of a memory address to identify a plurality of related memory addresses. One method of truncating memory addresses involves using a "logical shift right" operation. This operation shifts all bits in a memory address to the right, eliminating one or more least significant bits.

In one embodiment, illustrated in FIG. 4, controller 60 computes each tag 66 by logically shifting each memory address of the prefetch block two bits to the right. For example, prefetch block 74a comprises data associated with memory addresses 12–15 (represented as binary numbers 1100, 1101, 1110, and 1111). Controller 60 determines tag 66a by performing a logical shift of two bits to the right on these addresses. This eliminates the two least significant bits of the addresses, leaving a binary number of 11 as an index to prefetch block 74a. Controller 60 stores this index as tag 66a in tag table 64. Controller 60 repeats this procedure for each prefetch block 74a–74m stored in stream buffer 44.

Upon receiving a memory transfer request specifying a desired memory address, controller 60 performs the same logical shift right on the desired address and compares the resulting truncated address to tags 66a–66m in tag table 64. This comparison provides a quick determination of whether stream buffer 44 contains information associated with the desired memory address. If one of tags 66a–66m matches the truncated desired memory address, controller 60 takes the appropriate action (depending on the type of transfer desired) on the data stored in stream buffer 44 having a tag 66 that matches the truncated tag for the desired memory address.

In the illustrated embodiment, stream buffer 44 comprises a plurality of stream buffer lines 44a–44n. Each stream buffer line 44a–44n comprises an address entry 76 and a data entry 78. Data entry 78 contains a copy of data stored at a particular memory address in memory 20, and address entry 76 contains the memory address for data entry 78. When controller 60 retrieves data from stream buffer 44, controller 60 may use address entry 76 to locate the stream buffer line 44a–44n containing the data stored at the desired memory address in memory 20.

In an alternative embodiment, each stream buffer line 44a–44n comprises data entry 78. Controller 60 uses the desired memory address contained in the memory transfer request to locate the stream buffer line 44a–44n containing the desired data. Controller 60 locates a matching tag 66 identifying a prefetch block 74 in stream buffer 44 by truncating the desired memory address and comparing the truncated address with tags 66a–66m in tag table 64. Once controller 60 identifies the prefetch block 74 containing the desired data, controller 60 uses the least significant bits of the desired memory address to identify the stream buffer line in the identified prefetch block 74 that contains the requested data. For example, assuming that prefetch block 74a was identified as containing the desired data, if the two least significant bits of the desired memory address are 00, controller 60 retrieves the first stream buffer line 44a in prefetch block 74a. If the two least significant bits of the desired memory address are 01, controller 60 retrieves the second stream buffer line 44b in prefetch block 74a. If the desired memory address ends in 10, controller 60 retrieves the third stream buffer line 44c. If the two least significant bits of the desired memory address are 11, controller 60 retrieves the last stream buffer line 44d in prefetch block 74a.

Many methods also exist for determining the number of stream buffer lines 44a–44n that each tag 66 identifies. One method involves looking at the number of least significant bits controller 60 truncates to compute each tag 66.

In one embodiment, each tag 66 identifies 2×stream buffer lines 44a–44n, where x represents the number of least significant bits that controller 60 truncates. Computing each tag 66 by truncating the least significant bits of a memory address means that each tag can represent multiple memory addresses. In FIG. 4, controller 60 truncates memory address 13 (binary 1101) to compute a tag 66a of 3 (binary 11). Controller 60 could also compute a tag of 3 for memory addresses 12 (binary 1100), 14 (binary 1110), and 15 (binary 1111). In this example, x equals 2, so each tag 66 in FIG. 4 could identify $2^2$, or four, different memory addresses in memory 20, which are stored in stream buffer 44.

Many methods exist for selecting the data to prefetch from memory 20 given a particular desired memory address. One method involves retrieving data from memory addresses that result in a common tag after truncating a particular number of least significant bits in the addresses. As explained above, multiple memory addresses can have the same computed tag. In FIG. 4, addresses 12–15 (binary 1100–1111) have a tag of 3 (binary 11) after a logical shift right of two bits. By retrieving data from memory addresses having the same computed tag, a prefetch block of data can be stored in stream buffer 44 and represented by a single tag 66 in tag table 64.

In this embodiment, controller 60 determines a range of memory addresses in memory 20 to retrieve by modifying the desired memory address in the following way. To get a low address in the range, controller 60 would replace the least significant bits of the desired memory address with "zeroes." To get a high address in the range, controller 60 would replace the least significant bits of the desired memory address with "ones." The range of addresses between the low and high memory addresses would include the desired memory address, and all addresses would have the same computed tag. By using this range to define a prefetch block of data, a single tag 66 in tag table 64 can represent all memory addresses in the range.

By way of illustration, using the embodiment described in FIG. 4, assume that a read memory transfer request requests data from a desired memory address of 13 (binary 1101). Controller 60 determines that the low range address is 12 (binary 1100) by replacing the two least significant bits of the desired memory address with zeroes. Likewise, controller 60 determines that the high range address is 15 (binary 1111) by replacing the two least significant bits of the desired memory address with ones. Controller 60 retrieves a prefetch block of data from memory addresses 12–15 in memory 20 and stores the prefetch block in stream buffer lines 44a–44d. The data from memory addresses 12–15 (binary 1100–1111) are all represented by the single tag 66a in tag table 64.

Prefetching data in this manner presents several technological advantages. For example, computer systems typically divide memory into logical page units. Data can be read and transferred faster when the data is located within the same logical page of memory, rather than in multiple pages. Prefetching data from memory addresses represented by the same tag ensures that the entire prefetch block of data is located on the same logical page in memory. Prefetching data from multiple memory addresses and representing that data by a single tag speeds up the memory transfer process.

Although each tag 66 in tag table 64 is shown only as two bits in FIG. 4, those skilled in the art will recognize that each tag 66 in tag table 64 may comprise any number of bits. Likewise, although controller 60 in FIG. 4 truncates the two least significant bits of each desired memory address to compute tags 66a–66m, those skilled in the art will recognize that controller 60 may truncate any number of bits of each desired memory address.

Figure 5:
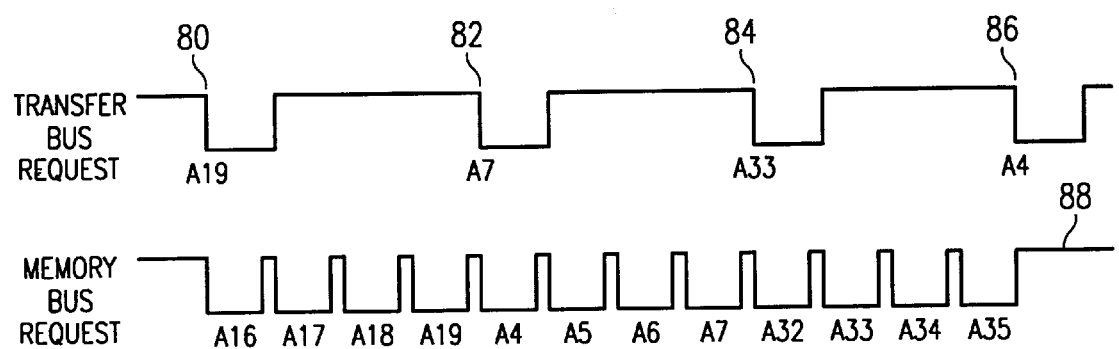
FIG. 5 is an exemplary timing diagram illustrating one example of the timing of memory instructions sent from a processor and from a stream buffer controller.

FIG. 5 is an exemplary timing diagram illustrating one example of the timing of memory instructions sent from processors 12a–12n and from stream buffer controller 42. FIG. 5 shows the timing of multiple read memory transfer requests sent from processors 12a–12n over transfer bus 14 and the corresponding memory instructions sent from system controller 16 over memory bus 18.

At a time 80, processors 12a–12n transmit a read memory transfer request involving memory address 19 to system controller 16. Stream buffer controller 42 determines that stream buffer 44 does not contain a copy of the data stored at memory address 19 in memory 20. Using, for example, the methods discussed above, controller 60 takes the desired memory address of 19 (binary 10011) and replaces the two least significant bits with zeroes. This yields a low range address of 16 (binary 10000). Controller 60 replaces the two least significant bits of the desired memory address with ones to get a high range address of 19 (binary 10011). Controller 60 issues four read memory transfer requests involving memory addresses 16, 17, 18 and 19.

At a time 82, processors 12a–12n request data stored at memory location 7 (binary 00111). Stream buffer controller 42 determines that stream buffer 44 does not contain a copy of the data stored at address 7 in memory 20. Stream buffer controller 42 determines that the low range address is 4 (binary 00100) and the high range address is 7 (binary 00111). Controller 60 issues read memory transfer requests for addresses 4, 5, 6 and 7. At a time 84, after determining that data stored at memory address 33 is not currently stored in stream buffer 44, stream buffer controller 42 issues read memory transfer requests for addresses 32, 33, 34, and 35.

At a time 86, however, processors 12a–12n request data stored at memory address 4 (binary 00100). Because stream buffer controller 42 already prefetched the data stored at memory address 4 at time 82, stream buffer controller 42 does not issue a memory instruction over memory bus 18 at a time 88. Instead, stream buffer controller 42 instructs stream buffer 44 to transmit the requested data to processors 12a–12n.

In a particular embodiment, central processing unit control interface 38 is designed so that stream buffer controller 42 saturates memory bus 18 with memory instructions. Stream buffer controller 42 constantly issues memory instructions over memory bus 18 without pause or delay. In FIG. 5, controller 60 constantly issues memory instructions over memory bus 18 between time 80 and time 86. In this embodiment, the size of stream buffer 44 depends on how many requests can be transmitted across transfer bus 14 and memory bus 18 within a given time period.

Each transfer bus 14 has a maximum request rate that represents the maximum number of requests that can be made over transfer bus 14 during a given time. Likewise, memory bus 18 has a maximum request rate that represents the maximum number of requests that can be made over memory bus 18 during a given time. Typically, the memory bus maximum request rate is higher than the maximum request rate for transfer bus 14, so multiple requests can be sent over memory bus 18 for every one request transmitted over transfer bus 14. In this embodiment, the number of stream buffer lines 44a–44n identified by each tag 66 in tag table 64 equals the maximum number of requests transmitted over memory bus 18 for every one request sent over transfer bus 14. In other words, the number of stream buffer lines 44a–44n represented by each tag 66 in tag table 64 is defined by $$\frac{\text{Memory bus maximum request rate}}{\text{Transfer bus maximum request rate}}. \tag{1}$$

Using this size for stream buffer 44 maximizes the size of the prefetch block without affecting the speed of transfer bus 14. In addition, this method ensures that stream buffer controller 42 may retrieve all data in a prefetch block before system controller 16 receives another memory transfer request from processors 12a–12n.

In the embodiment illustrated in FIG. 5, processors 12a–12n issue one memory transfer request over transfer bus 14 every four clock cycles. System controller 16 issues four memory instructions to memory 20 over memory bus 18 during the same period. Dividing the memory bus maximum request rate by the transfer bus maximum request rate yields a value of four. So, in this embodiment, each tag 66 in tag table 64 identifies four stream buffer lines 44a–44n in stream buffer 44. By making each prefetch block have a size of four data values, stream buffer controller 42 can retrieve the entire prefetch block from memory 20 before stream buffer controller 42 receives another memory transfer request from processors 12a–12n.

The embodiment illustrated in FIG. 5 shows stream buffer controller 42 issuing memory instructions for the prefetch block of data in a sequential order. At time 80, stream buffer controller issues instructions for memory addresses 16, 17, 18, and 19. At time 82, stream buffer controller 42 issues memory instructions for memory addresses 4, 5, 6, and 7. However, those skilled in the art will recognize that the prefetch block of data can be retrieved from memory 20 in any order. For example, stream buffer controller 42 could issue a memory instruction for the desired memory address first, and then issue three instructions for the other memory addresses within the prefetch block.

FIG. 5 also illustrates a technical advantage of the present invention. When a cache is physically located within processors 12a–12n, processors 12a–12n prefetch data by issuing multiple memory transfer requests over transfer bus 14. When processors 12a–12n are issuing memory transfer requests to prefetch data rather than performing other operations, the overall performance of computer system 10 decreases. With central processing unit control interface 38 located outside processors 12a–12n, system controller 16 may issue multiple memory instructions to memory 20 for every single memory transfer request issued by processors 12a–12n. Locating stream buffer 44 within system controller 16 provides one example of a configuration that meets this advantage. Other configurations could be implemented without departing from the scope of the invention.

Figure 6:
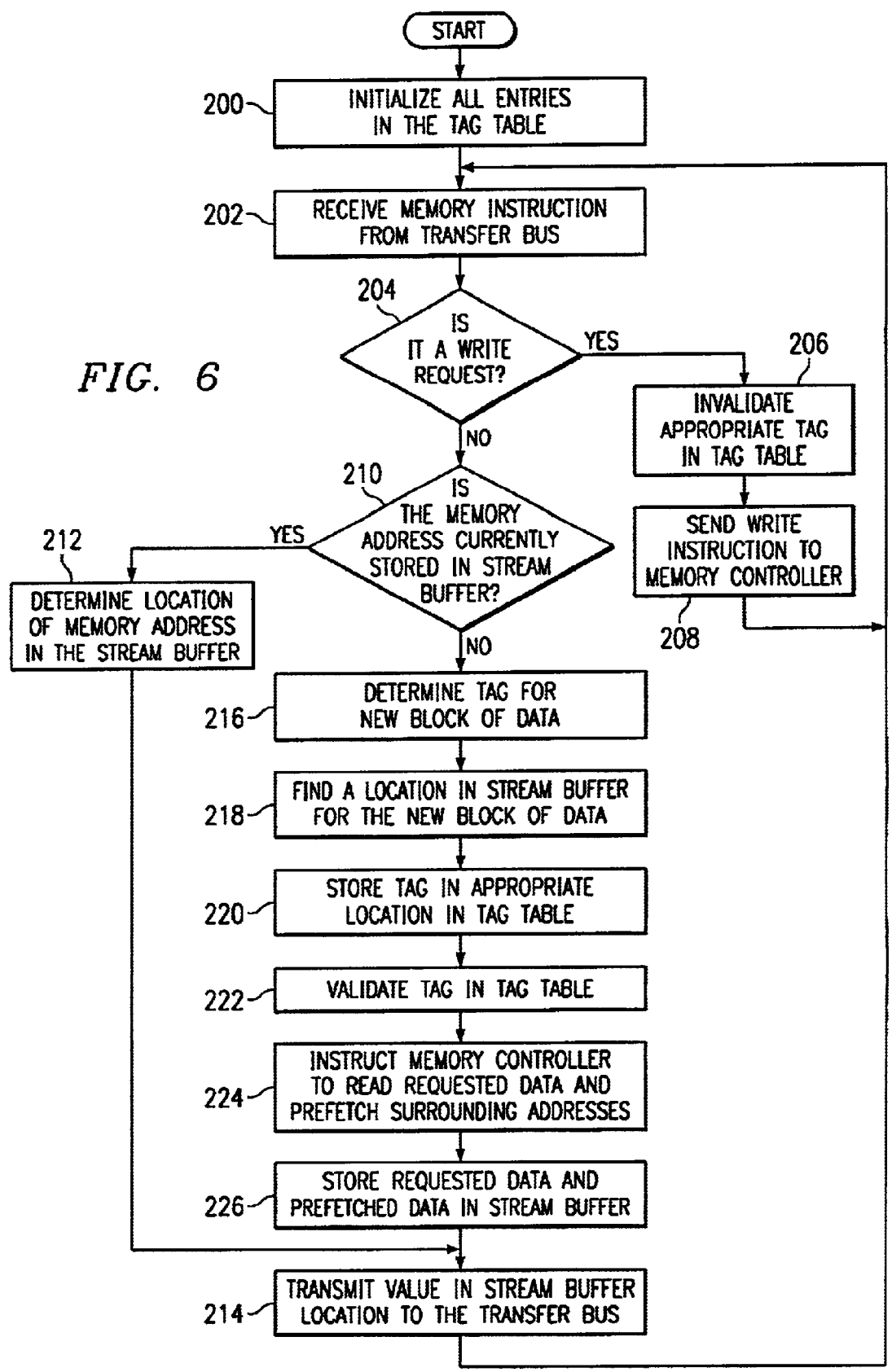
FIG. 6 is a flow chart illustrating an exemplary method for updating a stream buffer during a memory transfer request.

FIG. 6 is a flow chart illustrating an exemplary method for updating stream buffer 44 during a memory transfer request comprising a read or write operation. The method begins at step 200 where tag table 64 is initialized. This may include, for example, controller 60 setting each validity marker 68 to invalid. Controller 60 waits to receive a memory transfer request from memory request queue 40 at a step 202. When controller 60 receives a memory transfer request, controller 60 determines whether the memory transfer request comprises a read or write operation at a step 204. If controller 60 receives a write memory transfer request, controller 60 invalidates the appropriate tag 66 in tag table 64 at a step 206. In one embodiment, controller 60 sets the corresponding validity marker 68 of the appropriate tag in tag table 64 to invalid. In an alternative embodiment, controller 60 may store the new data value in the appropriate stream buffer line 44a–44n. Controller 60 transmits the write memory transfer request to memory controller 46 at a step 208, and returns to step 202 to await the next memory transfer request.

When controller 60 receives a read memory transfer request, controller 60 determines if stream buffer 44 contains a copy of the data stored at the desired memory address in memory 20 at a step 210. In one embodiment, controller 60 truncates the desired memory address in the read memory transfer request and compares the truncated address with tags 66a–66m in tag table 64. If stream buffer 44 contains a copy of the data stored at the desired memory address, controller 60 determines the exact location in stream buffer 44 where the requested data is stored at a step 212. This may comprise, for example, examining address entry 78 in stream buffer lines 44a–44n. Alternatively, controller 60 may use the least significant bits if the desired memory address to locate the desired data in stream buffer 44. Controller 60 instructs stream buffer 44 to transmit the requested data to transfer bus 14 at a step 214, and returns to step 202 to await another memory transfer request.

When controller 60 determines at step 210 that stream buffer 44 does not contain a copy of the data stored at the desired memory address, controller 60 computes a tag for the desired memory address at a step 216. This may include, for example, truncating the two least significant bits of the desired memory address. Controller 60 finds a location in stream buffer 44 where a prefetch block of data will be stored at a step 218. This may include, for example, selecting an invalid tag 66 in tag table 64. Controller 60 stores the computed tag in tag table 64 at a step 220. Controller 60 validates the new tag in tag table 64 by, for example, setting the corresponding validity marker 68 to valid at a step 222. Controller 60 issues multiple memory instructions to memory controller 46 in order to retrieve a prefetch block of data from memory 20 at a step 224. Memory 20 transmits the prefetch block of data to system controller 16, and the prefetch block is stored in stream buffer 44 at a step 226. The data requested by processors 12a–12n is transmitted over transfer bus 14 at step 214, and controller 60 returns to step 202 to await another memory transfer request from memory request queue 40.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for prefetching information from a computer storage comprising:
   a central processing unit operable to transmit to a transfer bus a memory transfer request containing a desired memory address;
   a system controller operable to receive the memory transfer request from the transfer bus and to retrieve a prefetch block of data from the computer storage in response to determining that a stream buffer local to the system controller does not contain a copy of data stored at the desired memory address, the system controller further operable to retrieve the data from the stream buffer and communicate the data to the central processing unit in response to determining that the stream buffer contains a copy of the data stored at the desired memory address; and
   a tag table comprising a plurality of tags, each tag identifying a location in the stream buffer where a prefetch block is stored, wherein the tag table resides external to the stream buffer.

2. The system of claim 1, wherein the central processing unit comprises a plurality of processors.

3. The system of claim 1, wherein the stream buffer is located within the system controller.

4. The system of claim 1, wherein each tag in the tag table is determined by truncating one or more least significant bits of each desired memory address.

5. The system of claim 4, wherein each tag in the tag table identifies $2^n$ data values in the stream buffer, where n represents the number of least significant bits truncated from each desired memory address.

6. The system of claim 1, wherein the tag table further comprises a plurality of validity markers operable to identify whether a tag in the tag table is valid, each tag having a corresponding validity marker.

7. The system of claim 1, wherein the prefetch block comprises the data stored at the desired memory address and data stored at a plurality of addresses associated with the desired memory address.

8. The system of claim 1, wherein the data comprising the prefetch block are located within a single logical page in a memory.

9. The system of claim 1, wherein the data comprising the prefetch block are located between a first prefetch memory address and a second prefetch memory address, where the first prefetch memory address is defined by replacing one or more least significant bits of the desired memory address with zeroes, and the second prefetch memory address is defined by replacing one or more least significant bits of the desired memory address with ones.

10. The system of claim 1, wherein the computer storage comprises a memory coupled to the system controller by a memory bus, the memory comprising the desired memory address.

11. The system of claim 10, wherein the system controller transmits instructions to the memory on the memory bus at a faster rate than the central processing unit transmits memory transfer requests to the system controller on the transfer bus.

12. A system for prefetching information from a computer storage comprising:
   a central processing unit operable to transmit to a transfer bus a memory transfer request containing a desired memory address;
   a system controller operable to receive the memory transfer request from the transfer bus and to retrieve a prefetch block of data from the computer storage in response to determining that a stream buffer local to the system controller does not contain a copy of data stored at the desired memory address, the system controller further operable to retrieve the data from the stream buffer and communicate the data to the central processing unit in response to determining that the stream buffer contains a copy of the data stored at the desired memory address;
   a tag table comprising a plurality of tags, each tag identifying a location in the stream buffer where a prefetch block is stored wherein the tag table resides external to the stream buffer;
   wherein the computer storage comprises a memory coupled to the system controller by a memory bus, the memory comprising the desired memory address;
   wherein the system controller transmits instructions to the memory on the memory bus at a faster rate than the central processing unit transmits memory transfer requests to the system controller on the transfer bus; and wherein the prefetch block has a size determined by dividing a memory bus maximum request rate by a transfer bus maximum request rate.

13. A system controller for prefetching information from a computer storage comprising:

a stream buffer operable to store a prefetch block of data;

a stream buffer controller coupled to the stream buffer, the stream buffer controller operable to receive a memory transfer request containing a desired memory address and to retrieve a prefetch block of data from the computer storage in response to determining that the stream buffer does not contain a copy of data stored at the desired memory address, the stream buffer controller further operable to retrieve the data from the stream buffer and communicate the data to a central processing unit in response to determining that the stream buffer contains a copy of the data stored at the desired memory address; and a tag table operable to identify a location of each prefetch block of data stored in the stream buffer, wherein the tag table resides external to the stream buffer.

14. The system controller of claim 13, wherein the tag table comprises:

a plurality of tags, each tag identifying a location in the stream buffer where a prefetch block is stored; and a plurality of validity markers defining when a tag in the tag table is valid, each tag having a corresponding validity marker.

15. The system controller of claim 14, wherein each tag in the tag table comprises a desired memory address having one or more least significant bits truncated.

16. The system controller of claim 15, wherein each prefetch block contains $2^n$ data values, where n represents the number of least significant bits truncated from the desired memory address.

17. The system controller of claim 14, further comprising a plurality of comparators coupled to the controller and to the tag table, each comparator operable to compare a data value from the stream buffer controller with a tag from the tag table.

18. The system controller of claim 13, wherein the prefetch block comprises the data stored at the desired memory address and data stored at a plurality of memory addresses associated with the desired memory address.

19. A method of prefetching information from a computer storage comprising:

receiving from a transfer bus a memory transfer request containing a desired memory address;

retrieving a prefetch block of data from the computer storage in response to determining that a stream buffer local to a system controller does not contain a copy of data stored at the desired memory address;

identifying based on a tag table a location in the stream buffer where the prefetch block is stored; and retrieving data from the location in the stream buffer and communicating the data to the transfer bus in response to determining that the stream buffer contains a copy of the data stored at the desired memory address, wherein the tag table resides external to the stream buffer.

20. The method of claim 19, further comprising the step of:

truncating at least one least significant bit of the desired memory address;

comparing one or more tags in the tag table with the truncated desired memory address, where each tag identifies a location in the stream buffer where a prefetch block of data is stored; and determining if a tag is valid after locating a matching tag in the tag table.

21. The method of claim 20, further comprising the step of invalidating a tag in the tag table in response to determining that the memory transfer request comprises a write operation.

22. The method of claim 19, wherein the step of retrieving the prefetch block of data from the computer storage comprises retrieving from the computer storage the data stored at the desired memory address and data stored at a plurality of memory addresses associated with the desired memory address.

23. The method of claim 19, further comprising the step of storing the prefetch block of data in the stream buffer.

24. The method of claim 23, further comprising the step of transmitting the data stored at the desired memory address to the transfer bus.

* * * * *